United States Patent [19]

Daly et al.

[11] Patent Number: 4,945,229

[45] Date of Patent: Jul. 31, 1990

[54] FIBER OPTIC RECEIVER AND TRANSCEIVER

[75] Inventors: C. David Daly, Whitehouse Station, N.J.; Ben Khoshnood, Coral Springs, Fla.

[73] Assignee: Thomas & Betts Corporation, Bridgewater, N.J.

[21] Appl. No.: 291,799

[22] Filed: Dec. 29, 1988

[51] Int. Cl.⁵ ................................................ H01J 5/16
[52] U.S. Cl. ............................. 250/227.11; 250/214 A
[58] Field of Search .......................... 250/214 A, 227; 455/610, 612, 619; 361/412, 413

[56] References Cited

U.S. PATENT DOCUMENTS

| | | | |
|---|---|---|---|
| 3,214,700 | 10/1965 | Hook | 328/165 |
| 3,253,246 | 5/1966 | McConnell et al. | 339/17 |
| 3,268,772 | 8/1966 | Kamei et al. | 317/100 |
| 3,290,520 | 12/1966 | Wennik | 307/88.5 |
| 3,475,657 | 10/1969 | Knowles | 371/101 |
| 3,522,485 | 8/1970 | Metrick | 317/101 |
| 3,592,212 | 7/1971 | Schleimer et al. | 137/93 |
| 3,673,508 | 6/1972 | Callahan, Jr. | 330/30 |
| 3,819,989 | 6/1974 | Braune | 317/101 |
| 3,829,741 | 8/1974 | Athey | 317/101 |
| 3,879,662 | 4/1975 | Barneck | 324/98 |
| 3,992,686 | 11/1976 | Canning | 333/84 |
| 4,201,979 | 5/1980 | Baron | 340/181 |
| 4,250,536 | 2/1981 | Barringer et al. | 361/413 |
| 4,456,840 | 6/1984 | Ide et al. | 307/362 |
| 4,495,546 | 1/1985 | Nakamura | 361/412 |
| 4,498,717 | 2/1985 | Reimer | 339/17 |
| 4,554,508 | 11/1985 | Hague | 329/101 |
| 4,574,331 | 3/1986 | Smolley | 361/393 |
| 4,706,300 | 11/1987 | Minemura | 455/619 |
| 4,733,093 | 3/1988 | Graves | 250/227 |
| 4,744,626 | 5/1988 | Mery | 250/227 |

*Primary Examiner*—David C. Nelms
*Assistant Examiner*—Sherrie Hsia
*Attorney, Agent, or Firm*—Robert M. Rodrick; Salvatore J. Abbruzzese

[57] ABSTRACT

A fiber optic receiver of the type having a sensor, a pre-amplifier and a post-amplifier, includes a first printed circuit board with connection of the post-amplifier therewith and having a matable connector thereon for obtaining power for operation of the post-amplfier. A second printed circuit board is supported by the first printed circuit in intersecting geometric relation to the first printed circuit board and is electrically connected therewith for obtaining power for operation of the pre-amplifier. The pre-amplifier and the sensor are mounted on the second printed circuit board and are electrically interconnected thereon. The receiver further includes a channel for detecting the presence of the carrier of energy incident on the sensor incorporation a differential peak detector circuit. A transmitter may be incorporated to provide a fiber optic transceiver.

15 Claims, 3 Drawing Sheets

FIBER OPTIC RECEIVER AND TRANSCEIVER

FIELD OF THE INVENTION

This invention relates generally to optoelectronics and pertains more particularly to apparatus for receiving and transmitting optical signals.

BACKGROUND OF THE INVENTION

Fiber optic transceivers interface with optical fibers for transmitting light signals thereto, typically through a light-emitting diode (LED) or like device responsive to electrical excitation to output light pulses corresponding with digital signals providing the information for such excitation. Signal to noise ratio is relatively high in the transmitter and information loss is according a low probability matter.

The contrary is the case with the receiver of the transceiver, incoming signal levels in the incoming optical fiber being relatively low. Receiver design is accordingly more demanding than transmitter design.

Fiber optic receivers typically have three sections, the first being a light sensor interfacing directly with the fiber and comprised of a photodiode or the like, responsive to incident light to issue output electrical signals corresponding to such incident light. The second section is a pre-amplifier and the third section is a post-amplifier, the former issuing an analog output signal and the latter converting such analog signal into a digital signal suitable for use in associated digital circuitry.

Experience with current commercial pre-amplifier chips designed for use in fiber optic receivers establishes that they are highly susceptible to interference from spurious signals and to oscillation due to feedback from latter stages of the receiver, for example, the post-amplifier. Intelligence is of course lost during such pre-amplifier oscillations, an undesired situation even in the environment of sophisticated error-correction encoding of transmitted data.

SUMMARY OF THE INVENTION

The present invention has as its primary object the provision of improved fiber optic receivers having lessened susceptibility to pre-amplifier oscillation.

A particular object of the invention is to provide a fiber optic receiver enabling use of current commercial pre-amplifier chips exhibiting oscillation susceptibility due to feedback from later receiver stages.

A further object of the invention is to provide improved post-amplifier circuitry for fiber optic receivers.

In attaining the foregoing and other objects, the invention provides a fiber optic receiver of the type having a sensor, a pre-amplifier and a post-amplifier, including a first printed circuit board with connection of the post-amplifier therewith and having a matable connector thereon for obtaining power for operation of the post-amplifier. A second printed circuit board is supported by the first printed circuit board in intersecting geometric relation to the first printed circuit board and is electrically connected therewith for obtaining power for operation of the pre-amplifier. The pre-amplifier and the sensor are mounted on the second printed circuit and are electrically interconnected thereon.

The arrangement thus provided has beneficial effect in isolating the pre-amplifier from oscillation-inducing influence of the post-amplifier and in minimizing the length of the electrical connection of the output of the sensor and the pre-amplifier input.

The receiver further preferably includes a channel for detecting the presence of the carrier of energy incident on the sensor and incorporating a differential peak detector circuit. A transmitter may be incorporated to provide a fiber optic transceiver.

The foregoing and other objects and features of the invention will be further understood from the following detailed description of the preferred embodiment and practice of the invention and from the drawings wherein like reference numerals identify like parts and components throughout.

DESCRIPTION OF PREFERRED EMBODIMENTS AND PRACTICES

Figure 1:
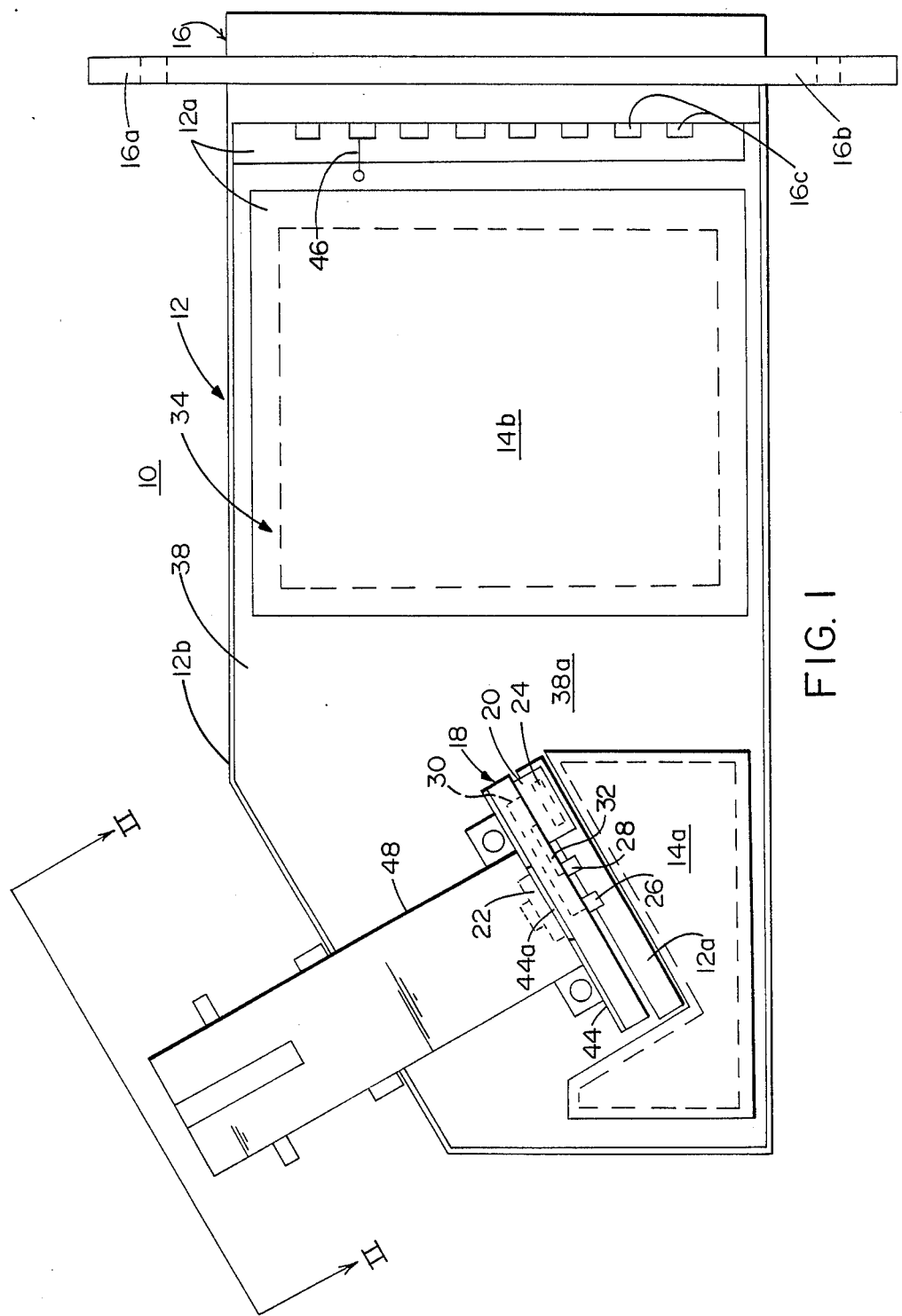
FIG. 1 is a top plan elevational view of a fiber optic receiver constructed in accordance with the invention.
Figure 3:
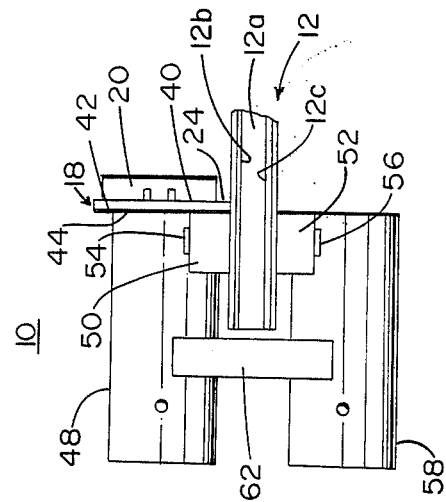
FIG. 3 is a right side elevational view of the partial showing of FIG. 2.
Figure 2:
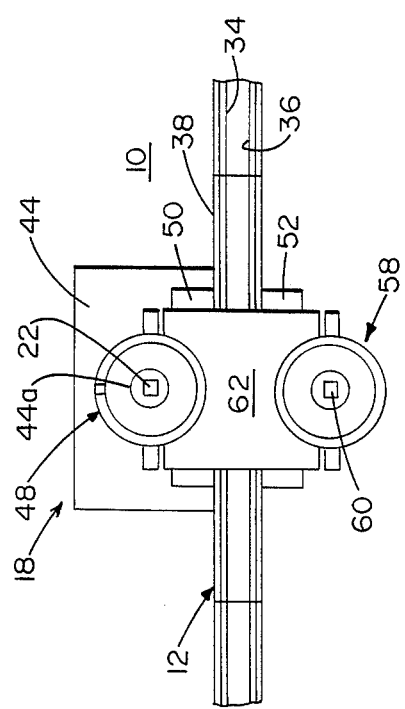
FIG. 2 is a reduced scale, partial, front elevational view as would be seen from plane II—II of FIG. 1, with the output part of a transmitter being shown additionally to the receiver of FIG. 1 and mounted on the undersurface of the FIG. 1 printed circuit board.

Referring collectively to FIGS. 1–3, apparatus 10 of the invention includes a first printed circuit board 12, which supports and connects electrically with post-amplifier 14a, 14b, and includes a matable connector 16 at its leftward end for obtaining electrical power for operation of the post-amplifier and conveying receiver output signals to associated digital circuitry. Connector 16 includes mounting flanges 16a and 16b and contacts or terminals 16c extending therethrough.

Board 12 is inclusive of a central electrically insulative planar body 12a, having etchable conductive layers 12b and 12c thereon. These conductive layers are etched away in customary fashion to leave desired electrically conductive connection traces on the board for interconnection of components to be mounted thereon. Exposed parts of body 12a, i.e., etched away areas of layer 12b, are seen as designated by 12a in FIG. 1.

A second printed circuit board 18 is supported by the first printed circuit board in intersecting geometric relation to the first printed circuit board, preferably such that the boards 12 and 18 are in mutually orthogonal geometric relation.

Pre-amplifier 20 and sensor 22 are supported on board 18 and the former is electrically connected to board 12 for obtaining electrical power for operation thereof, such connection being indicated schematically at 24. Electrical connection between sensor 22 output terminals 26 and 28 and the input terminals of the pre-amplifier 20 is effected by board 18 traces indicated schematically at 30 and 32.

Board 12 has a first surface 34, which is the upper surface of insulative body 12a, from which board 18 extends, and a second surface, the lower surface 36 of insulative body 12a. A ground plane member 38 overlies surface 34.

Board 18 likewise has a first surface 40 and a second opposite surface 42. Pre-amplifier 20 is mounted on surface 40. Surface 42 has a ground plane member 44 thereon, defining a central opening 44a therethrough for exposure of sensor 22. Ground plane member 44 is electrically continuous with ground plane member 38 of board 12.

Ground plane member 38 includes a portion 38a spacing post-amplifier 14a, 14b from second printed circuit board 18. Further, ground plane member 38 has portions defining a continuous boundary for post-amplifier 14a, 14b and has electrical connection to a ground terminal of matable connector 16, as is indicated schematically at 46.

For purposes of receiving a suitably terminated optical fiber, apparatus 10 includes a fiber connector housing 48 which is preferably an electrically conductive tubular member disposed in circumscribing relation to sensor 22 and extending outwardly of board 18. Housing 48 is secured to board 12 by housing flanges 50 and 52 and pins 54 and 56, and is electrically connected with both such ground plane members 38 and 44.

In configuring the apparatus 10 as a transceiver, a further fiber connector housing 58 for transmission purposes is included and is supported at the undersurface of board 18. This housing is likewise provided as an electrically conductive tubular member disposed in circumscribing relation to transmitting element 60, which may be a light-emitting diode (LED). A spacing cradle 62 is provided for housings 48 and 58.

Figure 4:
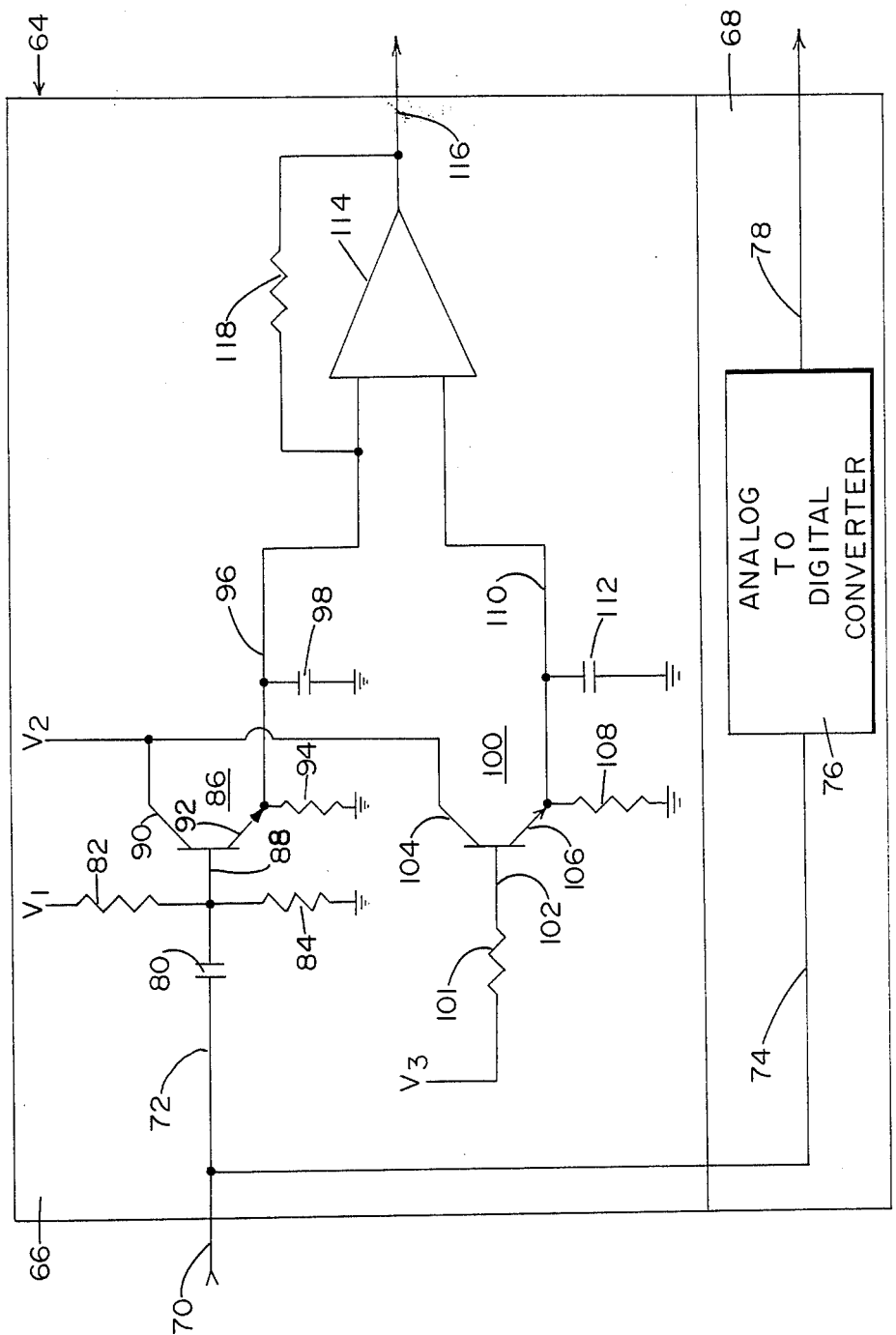
FIG. 4 is a circuit diagram of a portion of the post-amplifier of FIG. 1.

Turning to FIG. 4, post-amplifier circuitry 64 has first and second channels 66 and 68, input to which is provided in common by line 70, comprising the output of pre-amplifier 20, and is applied to lines 72 and 74, serving channels 66 and 68, respectively.

Line 74 supplies the pre-amplifier output to analog to digital converter 76, which provides the apparatus data output on line 78.

Channel 66 includes capacitor 80, series-connected with line 72, a voltage divider tied to voltage supply V1 and comprised of resistors 82 and 84 and transistor stage 86, the base 88 of the transistor being connected to the junction of capacitor 80 and resistors 82 and 84, the collector 90 of the transistor being connected to a voltage supply V2, and the emitter 92 of the transistor being connected through resistor 94 to ground. The transistor stage is configured in emitter-follower mode, line 96 being connected to emitter 92 and coupled to ground through capacitor 98.

Channel 66 also has a reference signal generating section, comprising a transistor stage 100 having a transistor base 102 coupled to voltage supply V3 through resistor 101, a collector 104 tied to voltage supply V2, an emitter 106 coupled to ground through resistor 108 to ground, and emitter-follower output line 110, coupled to ground through capacitor 112.

Comparator 114 receives as inputs the signals on lines 96 and 110 and provides its output signal on line 116, resistor 118 being connected between line 116 and line 96.

Channel 66 functions to detect the presence of the carrier of the transmission on the input optical fiber and its output on line 116 is thus a carrier-present flag, usable in associated digital circuitry for processing data indication on line 78 as usable data. Significant to the operation and functioning of channel 66 is the presence therein of the combination of capacitor 80 and resistor 84, which operate jointly to provide a differential peak detection circuit receiving the output of the pre-amplifier.

In the absence of carrier on line 70, transistor stage 86 is conductive due to biasing resistors 82 and 84, which are valued to place a positive voltage on line 88. The output voltage on line 96 is lower than voltage on line 110, causing comparator 114 to indicate the absence of carrier.

When line 70 has carrier, the output voltage on line 96 increases proportionately to the carrier input on line 70. Since the voltage on line 110 remains stable, the comparator 114 changes state to indicate the presence of carrier.

Various changes to the foregoing preferred embodiments and modifications to the described practices may be introduced without departing from the invention. Accordingly, it is to be understood that the particularly described apparatus and method is intended in an illustrative and not in a limiting sense. The true spirit and scope of the invention is set forth in the following claim.

What is claimed is:

1. A fiber optic receiver having a sensor, a pre-amplifier and a post-amplifier, said receiver comprising:
    (a) first printed circuit means having first surface for connection of said post-amplifier therewith and having matable connector means thereon for obtaining power for operation of said post-amplifier; and
    (b) second printed circuit means supported by said first surface of said first printed circuit means in orthogonal geometric relation to said first circuit means and electrically connected therewith for obtaining power for operation of said pre-amplifier, said second printed circuit means having a first and a second surface, said pre-amplifier being mounted on said second printed circuit means first surface and electrically interconnected thereon, said sensor being mounted on said second printed circuit means second surface and electrically interconnected thereon;
    said second printed circuit means second surface having a ground plane member thereon, said first printed circuit means first surface having a ground plane member thereon electrically continuous with said ground plane member of said second printed circuit means; and wherein said ground plane member of said first printed circuit means includes a spacing portion separating said post-amplifier from said second printed circuit means.

2. The invention claimed in claim 1 wherein said ground plane member of said first printed circuit means defines a continuous boundary for said post-amplifier and has electrical connection to a terminal of said matable connector.

3. The invention claimed in claim 1 wherein said ground plane member of said second printed circuit means defines an opening therethrough, said sensor being disposed in said opening on said second surface of said second printed circuit means.

4. The invention claimed in claim further including an optical fiber connector housing circumscribing said sensor and extending outwardly of said second printed circuit means.

5. The invention claimed in claim 4 wherein said fiber optic connector housing is secured to said first printed circuit means.

6. The invention claimed in claim 5 wherein said fiber optic connector housing is electrically conductive and is electrically connected with both said ground plane members.

7. The invention claimed in claim 4 wherein said fiber optic connector housing is comprised of a tubular conductive member extending orthogonally of said second printed circuit means.

8. The invention claimed in claim 1 wherein said first printed circuit means has a first surface and a second surface opposite said first surface, said post-amplifier being disposed on said first surface, further including a fiber optic transmitter means disposed on said second surface.

9. The invention claimed in claim 1 wherein said post-amplifier includes a first channel for providing a data output corresponding to light signals incident on said sensor and a second channel providing an output upon detection of the carrier of said light signals.

10. The invention claimed in claim 9 wherein said second channel includes a differential peak detection circuit receiving the output of said pre-amplifier and comparator circuit means receiving as a first input the output of said differential peak detection circuit and receiving a second reference input and generating output indication of carrier presence responsively to such first and second inputs.

11. The invention claimed in claim 10 wherein said differential peak detector circuit includes an input terminal receiving said pre-amplifier output, a capacitor and a transistor stage, said capacitor being series connected between said input terminal and the base of said transistor stage, and resistance means for connection between said base and the emitter of said transistor stage, said emitter providing said first input to said comparator circuit means.

12. The invention claimed in claim 11 wherein said comparator circuit means includes resistance means connected from the output of said comparator circuit means to said first input thereof.

13. In combination, in a post-amplifier of a fiber optic receiver having a sensor and a pre-amplifier:
   (a) a first channel for providing a data output corresponding to light signals incident on said sensor; and
   (b) a second channel providing an output upon detection of the carrier of said light signals, said second channel including a differential peak detection circuit receiving the output of said pre-amplifier and comparator circuit means receiving as a first input the output of said differential peak detection circuit and receiving a second reference input and generating output indication of carrier presence responsively to such first and second inputs.

14. The invention claimed in claim 13 wherein said differential peak detector circuit includes an input terminal receiving said pre-amplifier output, a capacitor and a transistor stage, said capacitor being series connected between said input terminal and the base of said transistor stage, and resistance means for connection between said base and the emitter of said transistor stage, said emitter providing said first input to said comparator circuit means.

15. The invention claimed in claim 14 wherein said comparator circuit means includes resistance means connected from the output of said comparator circuit means to said first input thereof.

* * * * *